United States Patent
Mednikov et al.

(10) Patent No.: US 7,602,175 B2
(45) Date of Patent: Oct. 13, 2009

(54) NON-CONTACTING POSITION MEASURING SYSTEM

(75) Inventors: Felix Mednikov, Ortenburg (DE); Martin Sellen, Ortenburg (DE); Eduard Huber, Eggenfelden (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 5 days.

(21) Appl. No.: 11/436,434

(22) Filed: May 18, 2006

(65) Prior Publication Data
US 2006/0202682 A1 Sep. 14, 2006

Related U.S. Application Data

(63) Continuation of application No. PCT/DE2004/002408, filed on Oct. 28, 2004.

(30) Foreign Application Priority Data
Nov. 20, 2003 (DE) ............................... 103 54 375

(51) Int. Cl.
*G01B 7/14* (2006.01)
(52) U.S. Cl. .................... 324/207.16; 324/207.26; 324/207.24
(58) Field of Classification Search ............ 324/207.16, 324/207.26, 207.24
See application file for complete search history.

(56) References Cited

U.S. PATENT DOCUMENTS

| | | | |
|---|---|---|---|
| 4,107,605 A * | 8/1978 | Hudgell | 324/220 |
| 5,260,651 A * | 11/1993 | Tischer et al. | 324/207.16 |
| 5,629,619 A | 5/1997 | Mednikov | |
| 5,811,969 A | 9/1998 | Kyodo | |
| 6,191,575 B1 | 2/2001 | Mednikov et al. | |
| 6,205,230 B1 * | 3/2001 | Sundman et al. | 382/100 |
| 6,246,230 B1 * | 6/2001 | Mednikov | 324/207.16 |
| 7,053,604 B2 * | 5/2006 | Laumen et al. | 324/207.19 |

FOREIGN PATENT DOCUMENTS

| | | |
|---|---|---|
| DE | 26 30 894 A1 | 1/1978 |
| DE | 35 25 199 A1 | 1/1987 |
| DE | 37 03 867 A1 | 8/1988 |
| DE | 40 29 633 A1 | 4/1991 |
| DE | 42 25 968 A1 | 2/1994 |
| DE | 198 32 854 C2 | 1/1999 |

* cited by examiner

*Primary Examiner*—Reena Aurora
(74) *Attorney, Agent, or Firm*—Alston & Bird LLP

(57) ABSTRACT

A non-contacting position measuring system comprising a sensor that includes a measuring coil which can be energized with alternating current, where the measuring coil comprises at least two voltage taps, an electrically or magnetically conductive object to be measured which is assigned to the sensor, and an evaluation circuit, where the sensor and the object to be measured can be displaced relative to one another in a longitudinal direction of the measuring coil. The position-measuring system presented is formed in such a manner that the object to be measured comprises at least one marking affecting the impedance of the measuring coil between two voltage taps so that the evaluation circuit provides an output signal correlating with the position of the object to be measured in relation to the voltage taps.

21 Claims, 3 Drawing Sheets

NON-CONTACTING POSITION MEASURING SYSTEM

CROSS REFERENCE TO RELATED APPLICATION

The present application is a continuation of international application PCT/DE 2004/002408, filed 28 Oct. 2004, and which designates the U.S. The disclosure of the referenced application is incorporated herein by reference.

BACKGROUND OF THE INVENTION

The invention relates to a non-contacting position measuring system having a sensor comprising a measuring coil which can be energized with alternating current, where the measuring coil comprises at least two voltage taps, with an electrically and/or magnetically conductive object to be measured which is assigned to the sensor, and with an evaluation circuit, where the sensor and the object to be measured can be displaced relative to one another in the longitudinal direction of the measuring coil.

Non-contacting position-measuring systems have been known in practice for years in the most varied embodiments. In particular, non-contacting position measuring systems with at least one sensor comprising a measuring coil are known, i.e., position measuring systems which operate either on the basis of eddy current or inductively.

Known arrangements for inductive position measurement operate, for example, according to the LVDT (linear variable differential transformer) principle and comprise one primary coil and two secondary coils, where the primary coils are supplied by oscillator electronics with an alternating current of constant frequency. A ferromagnetic core is moved without contact between the coils encapsulated in a housing. Depending on the position of the magnetic core, alternating voltages are induced in the two secondary coils. A displacement of the magnetic core causes a higher voltage in one secondary coil and a lower voltage in the other secondary coil, where the difference of two secondary voltages is proportional to the displacement of the core. It is problematic in this case that the actual object to be measured, whose motion is intended to be detected, must be mechanically connected to the magnetic core so that it picks up the motions to be measured. The connection can, for example, be realized by welding or via a thread. Both variants are mechanically extremely complicated.

From U.S. Pat. No. 5,629,619 an eddy current sensor is known in which a measuring coil has also already been provided with several voltage taps. The partial impedance of the measuring coil between two voltage taps is affected, depending on the position of the ring, by a ring engaging around the coil housing with spacing. With the aid of an evaluation circuit, the position of the ring relative to the voltage taps can be determined. In so doing, there is also the disadvantage that the object actually to be detected must be connected to the ring in a mechanically complicated manner.

The object of the present invention is to develop and extend a position-measuring system operating without contact and of the type stated in the introduction in such a manner that the object to be measured can be defined as a simple machine component.

SUMMARY OF THE INVENTION

The above objective and others are realized according to the invention by providing a non-contacting position measuring system comprising a sensor that includes a measuring coil which can be energized with alternating current, where the measuring coil comprises at least two voltage taps, an electrically or magnetically conductive object to be measured which is assigned to the sensor, and an evaluation circuit, where the sensor and the object to be measured can be displaced relative to one another in a longitudinal direction of the measuring coil. According thereto, the position-measuring system presented is formed in such a manner that the object to be measured comprises at least one marking affecting the impedance of the measuring coil between two voltage taps so that the evaluation circuit provides an output signal correlating with the position of the object to be measured in relation to the voltage taps.

According to the invention it has been recognized that it is extremely complicated to provide a special component (magnetic core, ring) interacting with the measuring coil to which the motion of the actual object to be measured is transferred by means of a mechanical connection. By the application, according to the invention, of a marking on the object to be measured, the marking affecting the impedance of the measuring coil between two voltage taps, an additional component can be omitted. Due to the marking provided on the object to be measured, it can interact as a simple machine part directly with the measuring coil, with corresponding positioning relative to the measuring coil, so that an output signal correlating with the position of the object to be measured in relation to the voltage taps is provided.

In a particularly advantageous manner, the marking could be an air gap or cutout portion since this could be produced particularly simply, e.g., by milling or by drilling. In addition to this, the object to be measured could be made of a single material such that production costs would be reduced significantly vis-à-vis known position-measuring systems.

Preferably, the object to be measured is embodied as a tube with at least one air gap and is disposed parallel to the axis of the measuring coil. In connection with an axis-parallel displacement of the tube, the presence of the air gap in one of the measuring coil sections defined by the voltage taps leads to an effect on the partial impedance of the corresponding coil section, which leads to corresponding output signals which are provided by the evaluation circuit.

With regard to an unambiguous determination of the position of the object to be measured, the air gap could have a width corresponding at most to the spacing between two adjacent voltage taps so that the air gap is always unambiguously localized between two voltage taps.

With regard to as large a range of measurement as possible, the length of the tube could correspond to approximately the length of the measuring coil. For the case that the tube is at least twice as long as the measuring coil, an optimal utilization of the sensor would result. The range of measurement would then be maximized and would correspond to the length of the measuring coil.

In a manner particularly simple from the standpoint of construction, the tube could comprise two air gaps opposite one another. Alternatively, the tube could also comprise three air gaps offset relative to one another by 120°, where in principle an arbitrary configuration of the air gap(s) is conceivable. In principle, a limit with regard to a particular development is only set by the necessary mechanical strength of the tube.

In one particular embodiment, the object to be measured could be made of a ferromagnetic material, e.g., iron. In this case, with motion of the tube relative to the measuring coil, the partial impedance of the measuring coil would be reduced in that section in which the air gap is located so that between the corresponding voltage taps a lower voltage would be tapped than between the other voltage taps.

Alternatively, the object to be measured could also be made of a non-ferromagnetic material, in particular of aluminum. The presence of the air gap in a certain section of the measuring coil would then have as a consequence an increase of the corresponding partial impedance and consequently an increase of the corresponding voltage value. In both cases, i.e., for a ferromagnetic as well as non-ferromagnetic tube, the wall thickness of the tube could be chosen in such a manner that it is greater than the penetration depth of the eddy current.

With regard to the ability of the position-measuring system to be used for many purposes, the object to be measured could be displaceable in the interior of the measuring coil. If the object to be measured is in addition formed as a tube, then a particular advantage results that the interior of the tube can be used at the same time for other functions. In particular, the interior of the tube could be used, for example, to transfer force by, for example, a shaft or a cable being guided through the tube. Also conceivable would be the utilization of the interior of the tube as an optical beam path or for cooling.

Depending on the particular use of the position-measuring system and on special demands on the geometry of the object to be measured, the object to be measured could be displaceable outside of the sensor in such a manner that the object to be measured encircles the measuring coil.

The measuring coil could be produced in one-layer or multi-layer technology and be wound around the coil body. With regard to material, a coil body of plastic is particularly suitable for this. For the realization of a compact construction the coil body could be embodied in the form of a plastic rod, which is particularly advantageous when the object to be measured is disposed outside of the sensor.

It would also be conceivable to make the coil body of an electrically conductive material with high specific electric resistance, where non-magnetic stainless steel is particularly suitable for this. In this case the wall thickness of the coil body could be chosen in such a manner that the penetration depth of the electromagnetic alternating field is less than the wall thickness of the coil body. This effect could also be achieved by a corresponding choice of the frequency of the alternating voltage applied to the measuring coil.

With regard to good manageability of the sensor, the coil body and the measuring coil could be encapsulated in a housing. In so doing, the housing can, for example, be made of plastic or another non-ferromagnetic material, in particular a stainless steel. Particularly in connection with an object to be measured guided within the coil body, a more compact encapsulated sensor can be made thereby.

The signals provided via the voltage taps and supplied to the evaluation circuit could be provided in a particularly simple manner by the evaluation circuit as an output voltage which varies linearly with the position of the air gap or the object to be measured. A possible evaluation circuit has been disclosed in detail, e.g., in U.S. Pat. No. 5,629,619. In order to obtain as good a resolution as possible for the determination of the position of the object to be measured, interleaving of the voltage taps in one another could be provided.

BRIEF DESCRIPTION OF THE DRAWINGS

Figure 1:
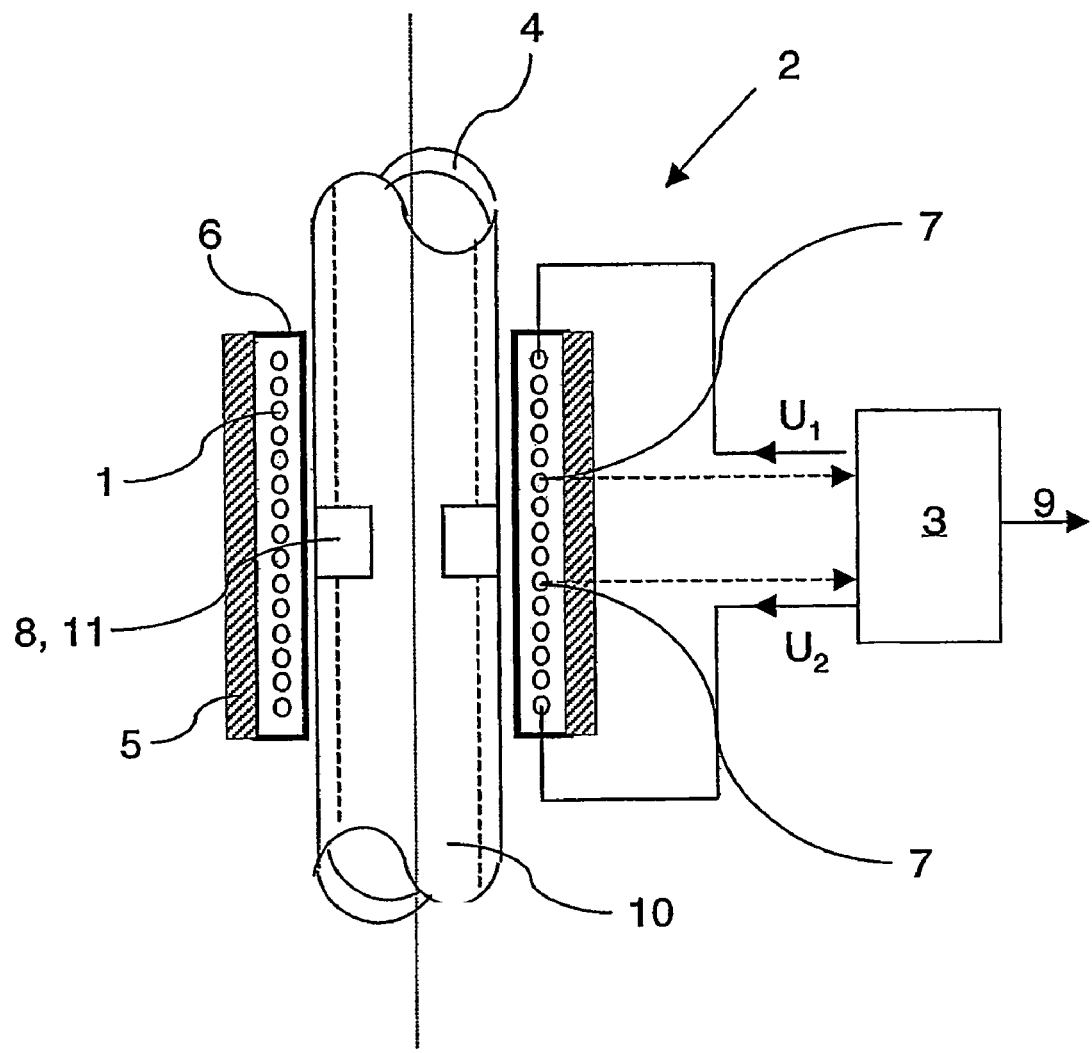
Figure 2:
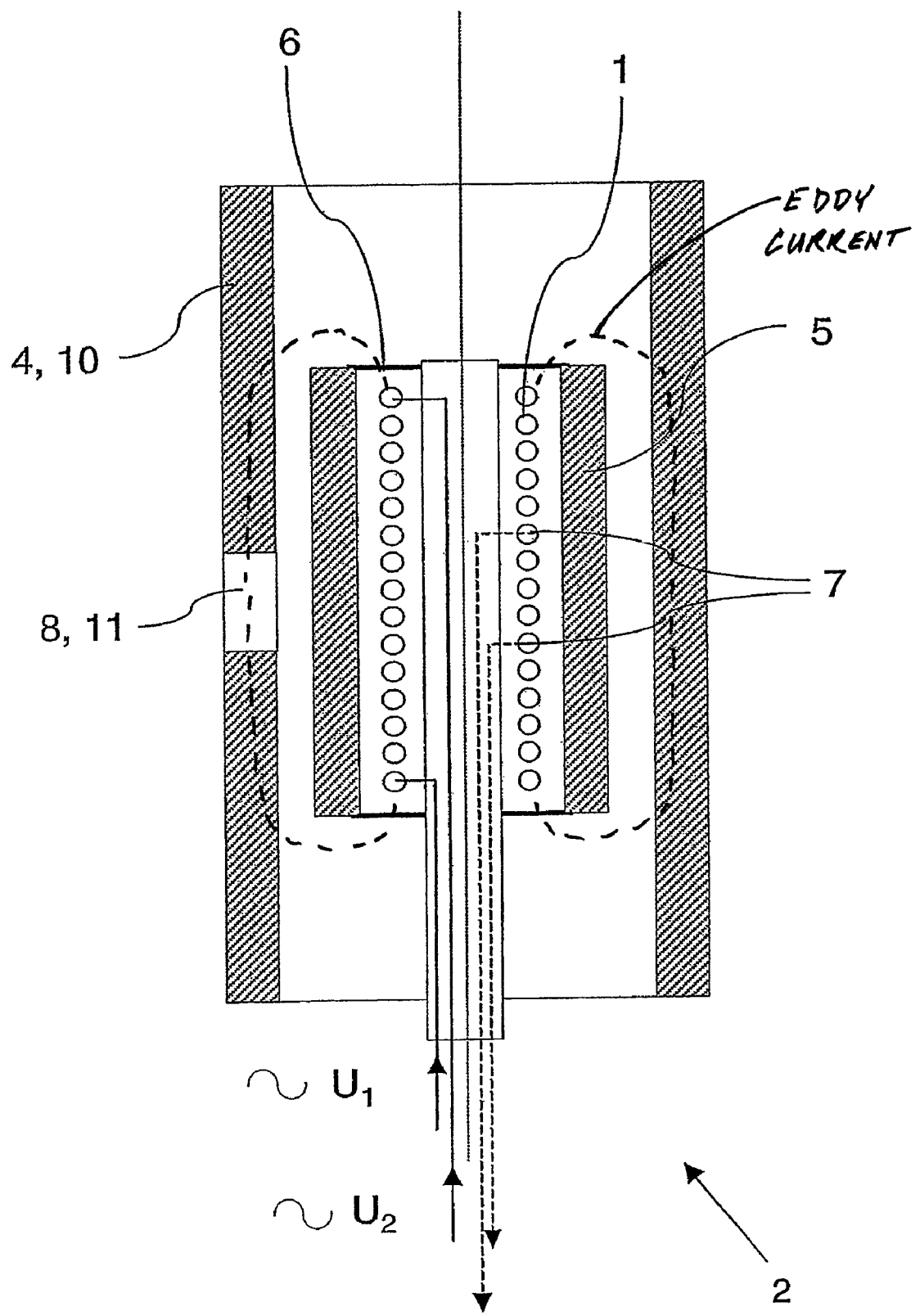
Figure 3:
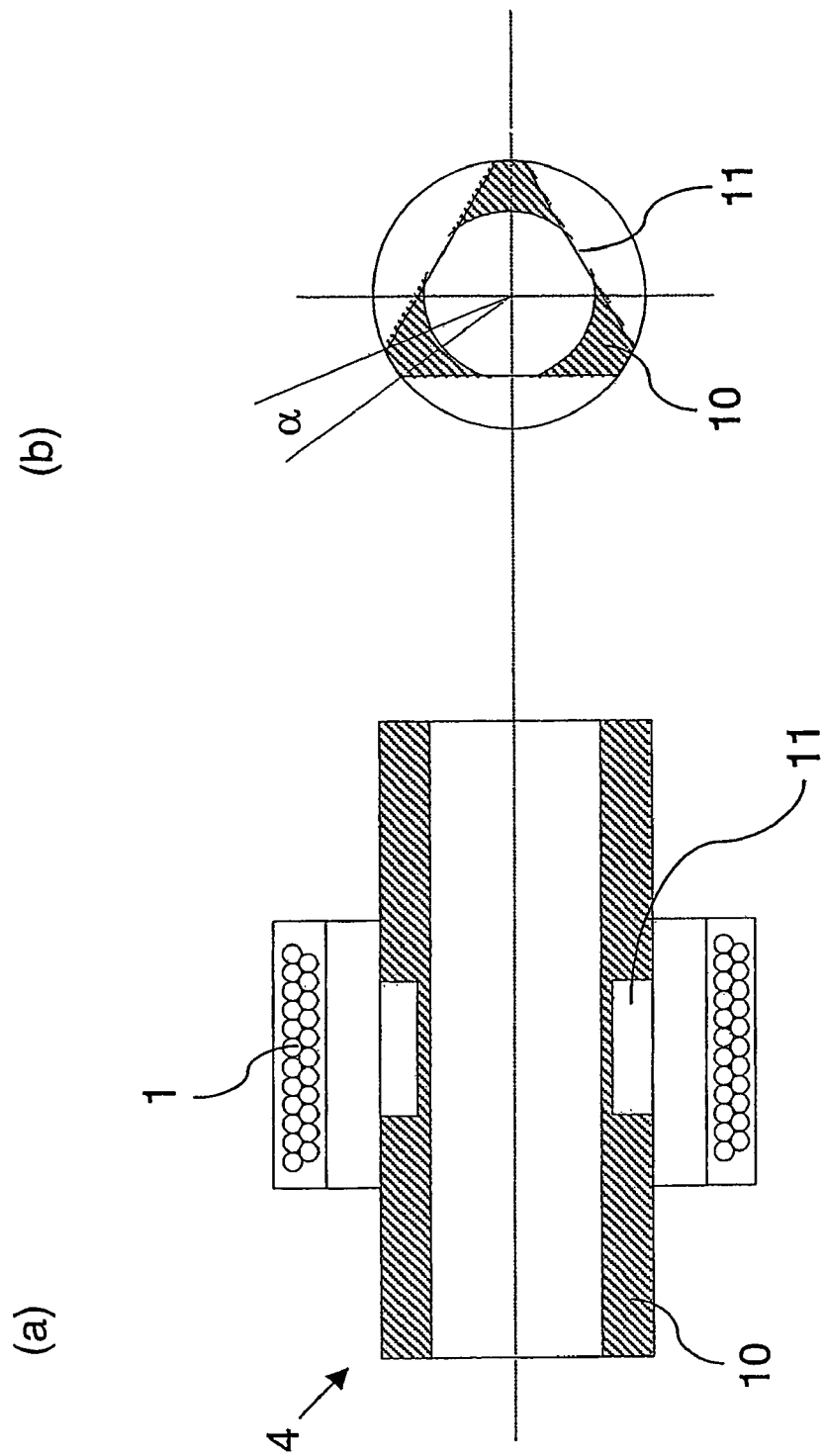

Having thus described the invention in general terms, reference will now be made to the accompanying drawings, which are not necessarily drawn to scale, and wherein:

FIG. 1 is a schematic representation of a first embodiment example of a position-measuring system according to the invention;

FIG. 2 is a schematic representation of a second embodiment example of a position-measuring system according to the invention; and FIG. 3 is a schematic representation a tubular object to be measured which comprises an air gap.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

FIG. 1 shows a first embodiment example of a non-contacting position-measuring system in accordance with the invention, with a sensor 2 comprising a measuring coil 1 which can be energized with alternating current, a power supply/evaluation circuit 3 connected to the sensor 2, and an electrically and/or magnetically conductive object 4 to be measured which is assigned to the sensor 2. The measuring coil 1 is embodied as an elongated coil, in fact as a cylindrical coil with uniform windings, and is wound onto a coil body 5, where the measuring coil 1 and the coil body 5 are encapsulated in a housing 6. Via the power supply/evaluation circuit 3 the measuring coil 1 is supplied with complementary alternating voltages $U_1$ and $U_2$.

In the embodiment example chosen here, the measuring coil 1 comprises two voltage taps 7 so that according to the number of voltage taps 7 voltage values between the individual voltage taps 7 can be tapped and supplied to the power supply/evaluation circuit 3. According to the invention, the object 4 to be measured comprises a marking 8 (also referred to herein as a discontinuity) affecting the impedance of the measuring coil 1 between two voltage taps 7 so that the evaluation circuit 3 provides an output signal 9 correlating with the position of the object 4 to be measured in relation of the voltage taps 7.

The object 4 to be measured, which is moved without contact within the measuring coil 1 and is encircled by it with a slight spacing, is embodied as a tube 10. The marking 8 is formed in this case in the form of a radial air gap 11 milled into the tube 10.

FIG. 2 shows, schematically, a second embodiment example of a position-measuring system according to the invention, where the same reference numbers relate to the same components as in FIG. 1. The essential difference with respect to the embodiment example according to FIG. 1 is that the object 4 to be measured is not moved within the measuring coil 1 without contact but rather that the object 4 to be measured encloses the sensor 2 in the form of a cylinder with a slight spacing. In order to achieve a compact construction in this embodiment example as well, the measuring coil 1 is wound onto a rod-like coil body 5. The measuring coil 1 and the coil body 5 are encapsulated in a housing 6 made of plastic. The lead wires for supplying the measuring coil 1 with the two complementary alternating voltages $U_1$ and $U_2$ as well as the voltage taps 7 are laid parallel to the rod-like coil body 5 from an end face of the sensor 2.

FIG. 3 shows schematically in a side view (a) and a plan view (b) an object 4 to be measured as well as a particular development of the air gap 11. As can be seen particularly clearly in the plan view, the air gap 11 is formed of three material recesses, each offset relative to the others by 120°. The three areas denoted by α, which form three partitioning walls in which the tube 10 has its full material thickness in the radial direction, are in principle only limited by the mechanical strength which the object 4 to be measured must have, depending on the particular application.

With regard to additional advantageous developments and extensions of the teaching according to the invention, reference is made on the one hand to the general part of the description and on the other hand to the accompanying claims.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purpose of limitation.

That which is claimed:

1. A non-contacting position measuring system comprising:
    a sensor that includes a measuring coil which can be energized with alternating current, and wherein the measuring coil comprises at least two voltage taps;
    an electrically or magnetically conductive object to be measured which comprises a tube having a wall of predetermined thickness and with the tube positioned adjacent the measuring coil so that the measuring coil induces eddy currents which penetrate the wall of the tube when energized;
    an evaluation circuit connected to the at least two voltage taps,
    wherein the sensor and the tube can be displaced relative to one another in a longitudinal direction of the measuring coil,
    wherein the tube includes at least one discontinuity affecting the impedance of the measuring coil between the at least two voltage taps so that the evaluation circuit provides an output signal which correlates the position of the tube in relation to the at least two voltage taps, and
    wherein the wall thickness of the tube is greater than the penetration depth of the eddy currents induced in the wall of the tube by the measuring coil when energized.

2. The non-contacting position measuring system of claim 1, wherein the discontinuity is a cut-out portion formed on the tube.

3. The non-contacting position measuring system of claim 1, wherein the at least one discontinuity extends at most over a distance corresponding to the distance between the two voltage taps.

4. The non-contacting position measuring system of claim 1, wherein the tube is at least twice as long as the measuring coil.

5. The non-contacting position measuring system of claim 1 wherein the tube comprises two cut-out portions in radially opposite sides of the tube.

6. The non-contacting position measuring system of claim 1, wherein the tube comprises three cut out portions which are circumferentially offset by 120°.

7. The non-contacting position measuring system of claim 1, wherein the tube comprises a ferromagnetic material.

8. The non-contacting position measuring system of claim 1, wherein the tube comprises a non-ferromagnetic material.

9. The non-contacting position measuring system of claim 8, wherein the tube comprises aluminum.

10. The non-contacting position measuring system of claim 1, wherein the tube is displaceable in an interior of the measuring coil.

11. The non-contacting position measuring system of claim 1, wherein the tube is displaceable outside of the sensor.

12. The non-contacting position measuring system of claim 1, wherein the measuring coil is wound onto a coil body.

13. The non-contacting position measuring system of claim 12, wherein the coil body comprises plastic.

14. The non-contacting position measuring system of claim 13, wherein the coil body is embodied in the form of a plastic rod.

15. The non-contacting position measuring system of claim 12, wherein the coil body comprises an electrically conductive material with high specific electric resistance.

16. The non-contacting position measuring system of claim 12, wherein the coil body comprises non-magnetic stainless steel.

17. The non-contacting position measuring system of claim 15, wherein a wall thickness of the coil body is greater than a penetration depth of the electromagnetic alternating field.

18. The non-contacting position measuring system of claim 12, wherein the coil body and the measuring coil are encapsulated in a housing.

19. The non-contacting position measuring system according to claim 18, wherein the housing is made of plastic, or non-ferromagnetic material, or steel.

20. The non-contacting position measuring system according to claim 1, wherein the output signal is provided as an output voltage.

21. The non-contacting position measuring system according to claim 1, wherein the voltage taps are interleaved in one another.

* * * * *